Patented June 20, 1939

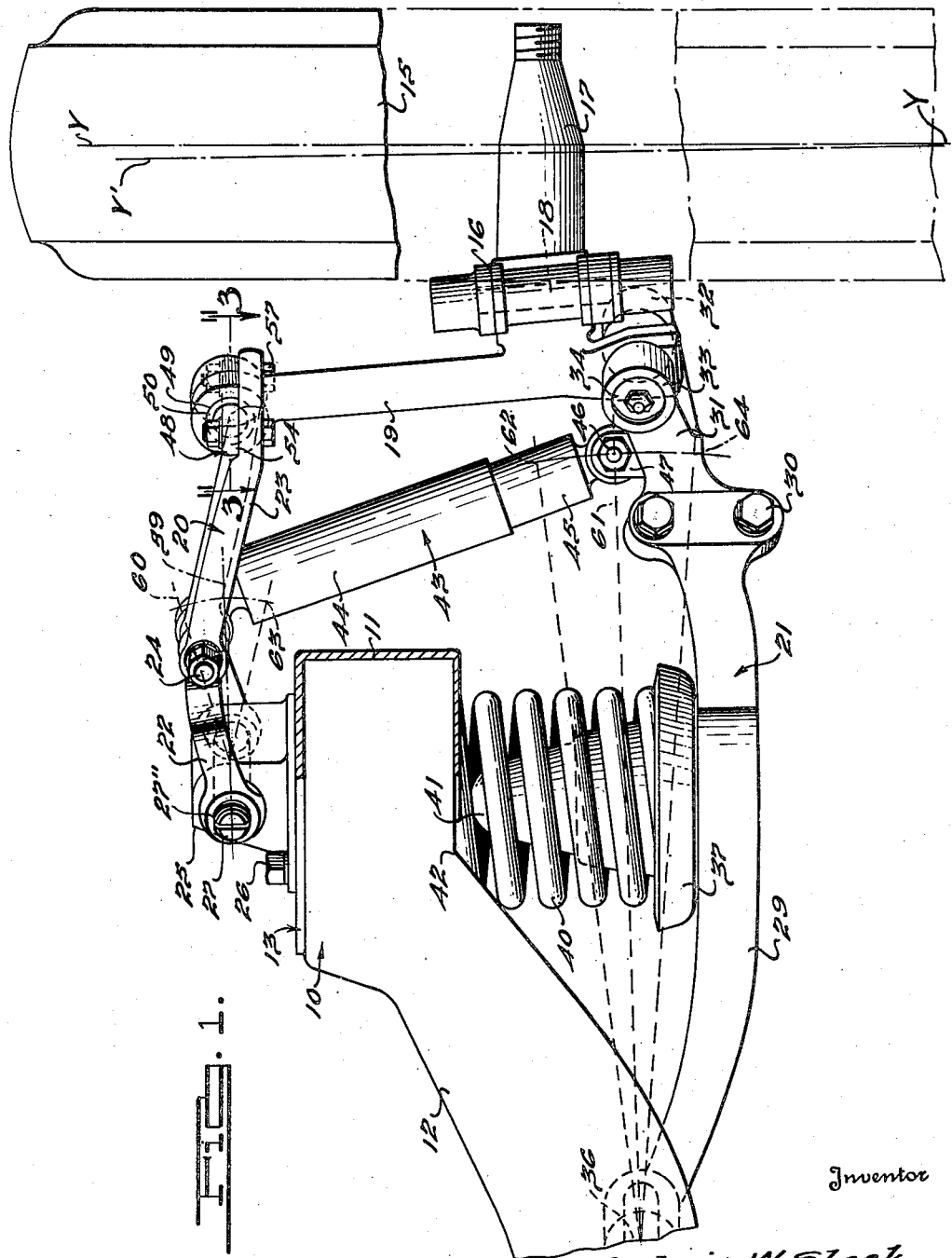

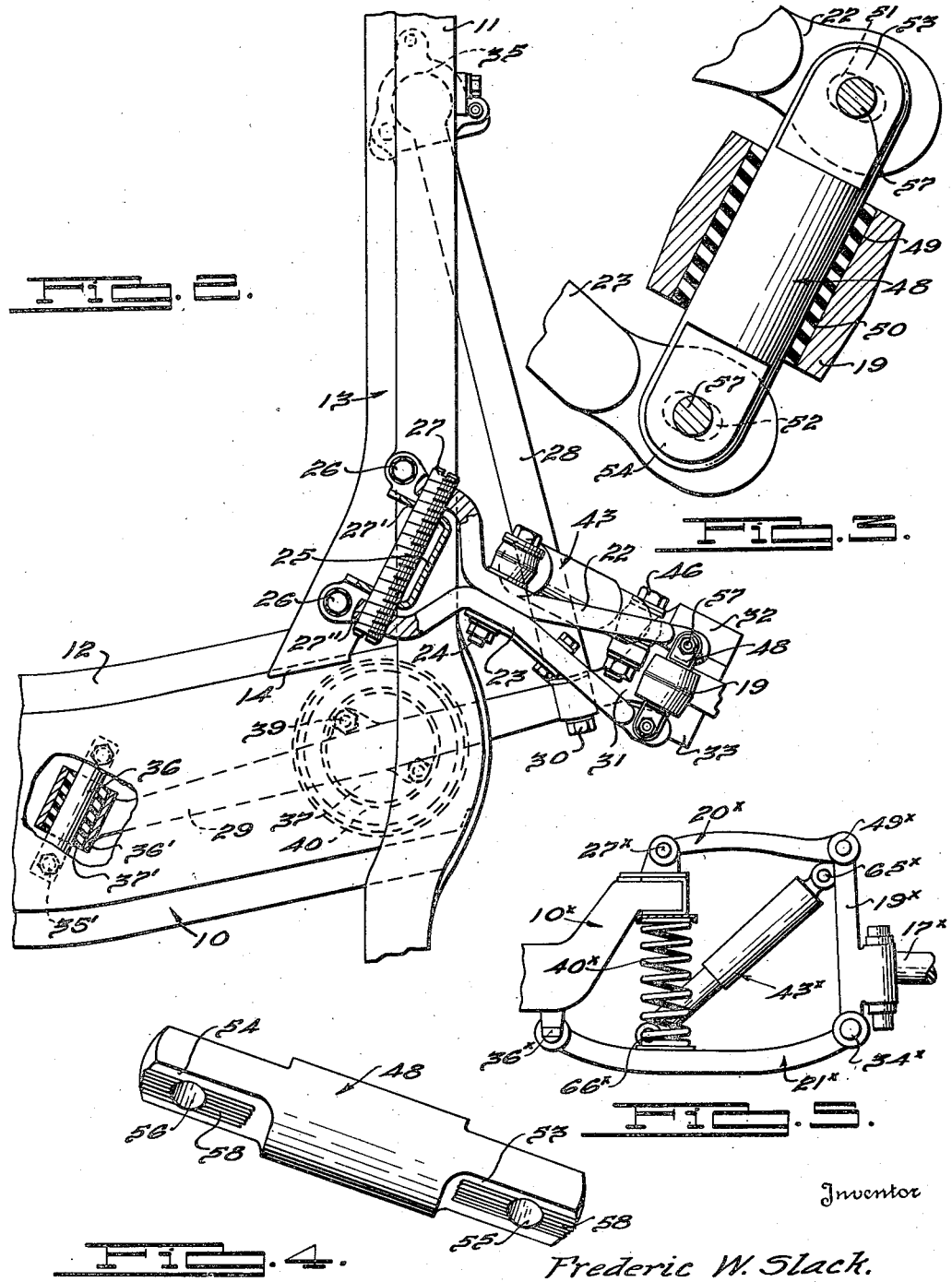

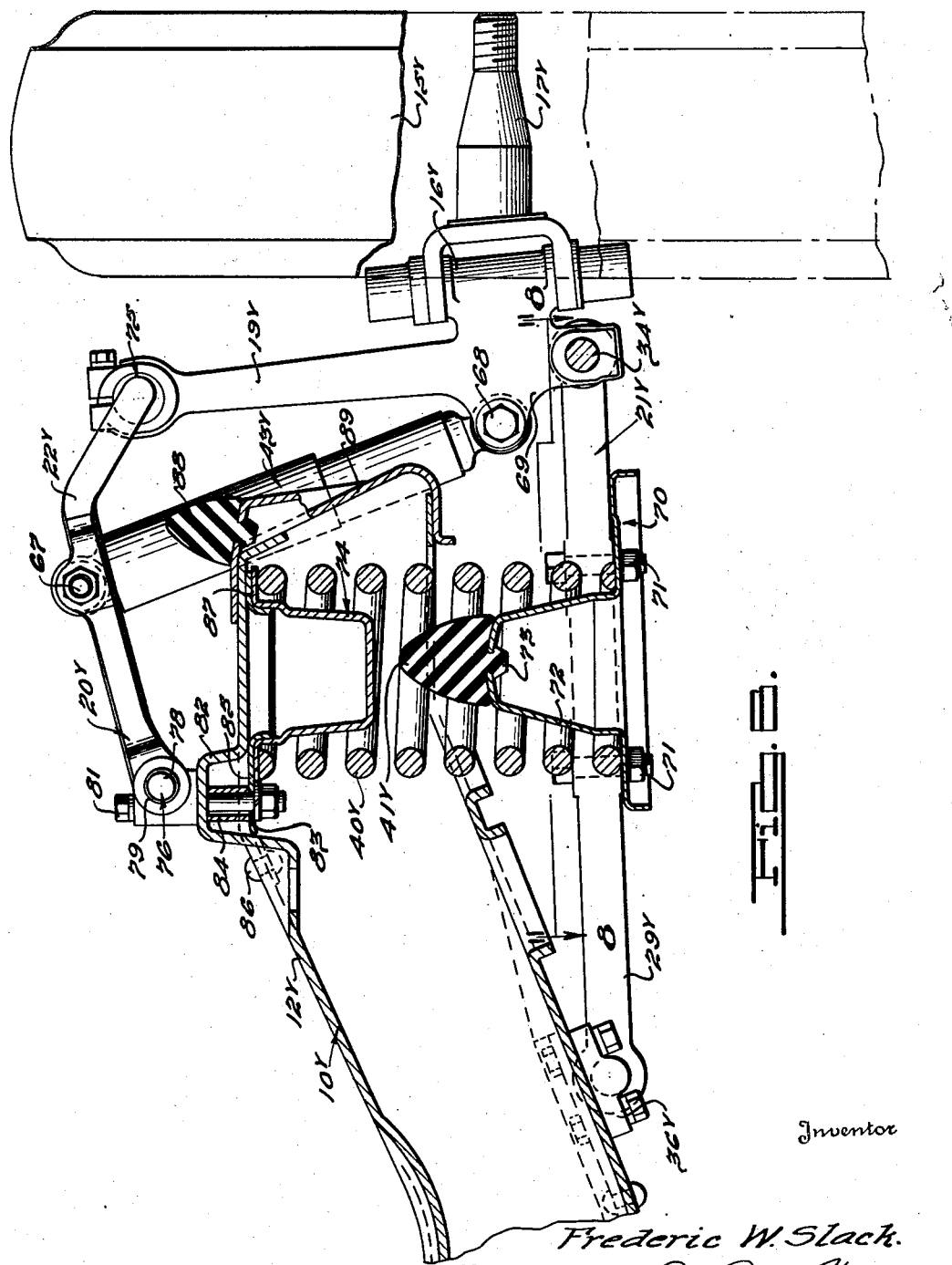

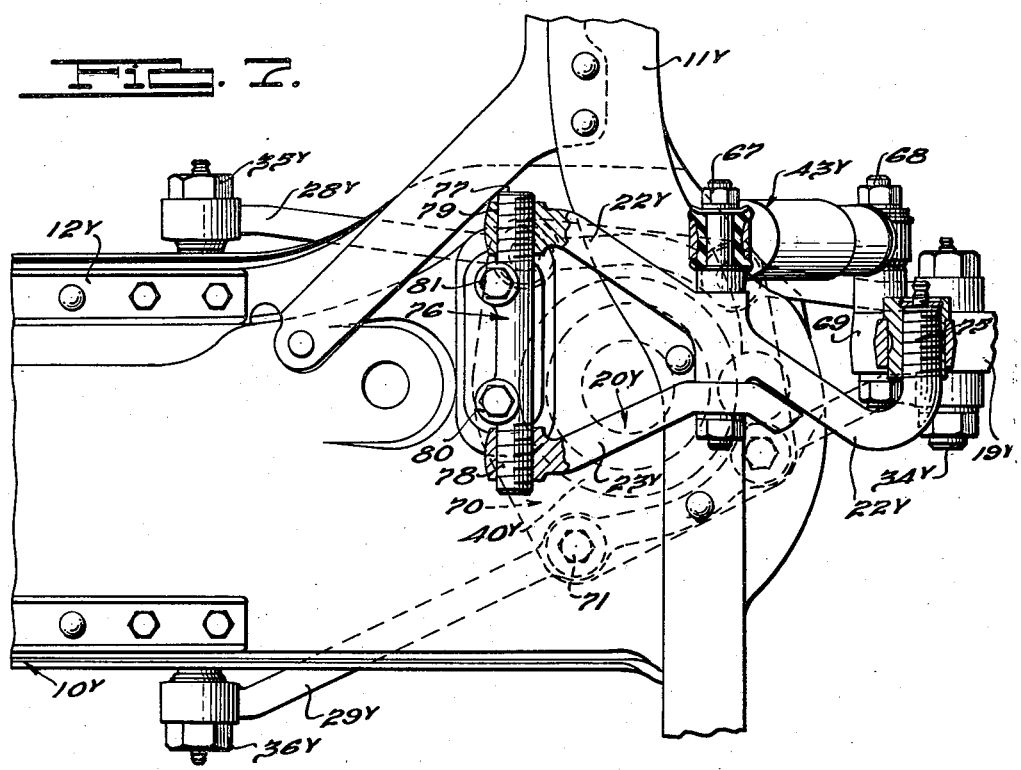
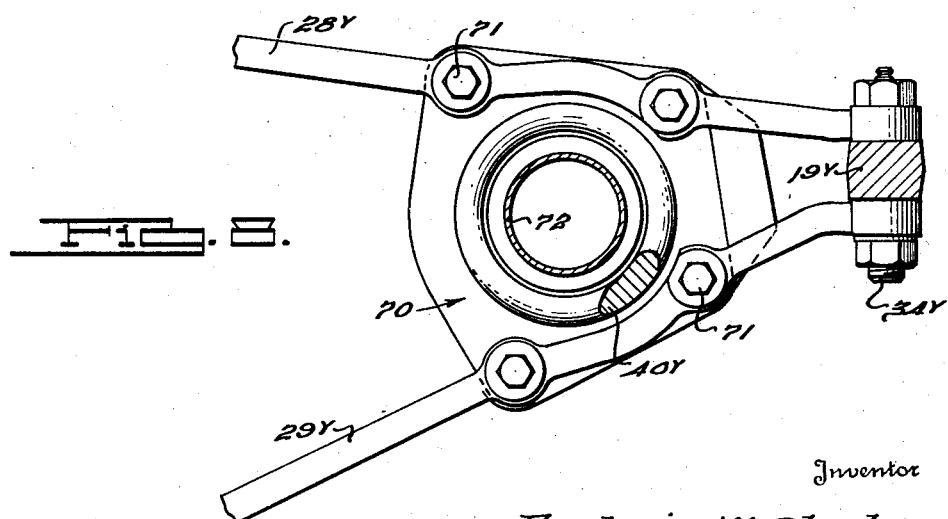

2,162,828

UNITED STATES PATENT OFFICE 2,162,828

WHEEL SUSPENSION

Frederic W. Slack, Detroit, Mich., assignor to Chrysler Corporation, Highland Park, Mich., a corporation of Delaware Application May 5, 1937, Serial No. 140,809

4 Claims. (Cl. 280—96.2)

This invention relates to motor vehicles and refers more particularly to improvements in road wheel suspension systems.

My invention is more particularly related to motor vehicles having steerable road wheels of the independently sprung type although in its broader aspects many of the features of my invention may be applied to non-steering road wheels, such as the rear driving wheels of a motor vehicle.

One object of my invention resides in the provision of a simplified arrangement of suspension linkage and shock absorber mechanism, by which the cost of manufacture and assembly of the suspension system and the operation of the suspension is improved.

Other objects of my invention are to provide a simplified arrangement of suspension linkage and shock absorber mechanism whereby a light weight shock absorber having a shorter stroke may be used to produce substantially the same results as are obtained with the aid of heavier and larger stroke shock absorbers, and to provide a shock absorber in a system of this kind which is located near the outer link end where it is most effective.

More specifically, my invention further provides a simple and inexpensive means for attaching the shock absorber directly to the suspension linkage to eliminate excess parts and to effect a simplified suspension of the type hereinbefore described having low cost and weight.

In suspension systems of the type mentioned, it is important to provide a predetermined desired wheel alignment and it is desirable to permanently maintain accuracy in the mounting of such wheels to provide the desired degree of camber. In actual production, difficulty has been experienced in maintaining the aforesaid characteristics in keeping with practical limitations, cost, workmanship, manufacturing tolerances, and the like.

It is an object of my invention to provide an improved means for easily and quickly making a permanent camber adjustment of a vehicle road wheel without disassembling the suspension.

A further object of my invention resides in the provision of a cushioning pivotal support means for the support members of the suspension linkage wherein one support member is in direct contact with rubber carried by another support member.

My improved suspension dampens unnatural and undesirable shocks and reduces noise transmission from the ground wheels through the suspension members.

An additional feature of my invention resides in an improved and comparatively light suspension linkage capable of manufacture at relatively low cost. My improved linkage, which is preferably the lower linkage, is so constructed that its cross member may be formed of a single sheet metal stamping and yet be adapted to function as a coil spring seat and a bumper cup where this type of spring is employed in the system for yieldingly supporting the frame on the ground wheels.

Another object of my invention is to provide a strong but inexpensive mounting means for pivotally supporting the upper link through a pin directly connected to the vehicle frame, and to thereby reduce the number of structural parts at this location.

More specifically, my upper link frame support preferably includes a novel frame construction wherein a box-like beam of the frame is closed by a plate member which is spaced by the fastening means which holds the link support pin to the frame. My frame construction thus provides an exceedingly strong, light and inexpensive reinforced box-like member for attaching thereto the upper linkage of the suspension.

Further objects and advantages will be more apparent from the following detailed description of several illustrative embodiments of my invention, reference being had to the accompanying drawings, in which:

Fig. 1 is a front elevational view, partly in section, of a front independent steerable wheel suspension embodying the invention.

Fig. 2 is a plan view, partly in section, of the wheel suspension illustrated in Fig. 1.

Fig. 3 is a fragmentary horizontal sectional view taken on line 3—3 of Fig. 1, and illustrating somewhat in detail the road wheel camber adjusting mechanism and one of the cushion supports of the support members of my suspension.

Fig. 4 is a perspective view of the steering knuckle support pin of the camber adjusting means shown in Fig. 3.

Fig. 5 is a reduced front elevational view similar to Fig. 1 but illustrating a wheel suspension embodying a modified form of the invention.

Fig. 6 is a vertical sectional view of a front independent steerable wheel suspension and improved frame mounting therefor embodying a further development of the invention.

Fig. 7 is a plan view of the suspension shown in Fig. 6, parts being broken away to disclose the underlying structure.

Fig. 8 is a horizontal sectional view taken on line 8—8 of Fig. 6.

According to the illustrated embodiment of my invention, the motor vehicle is provided with a frame structure 10 having the usual side chassis rails, one of which is illustrated at 11, and a transversely extending cross member 12 which connects the side rails 11. A frame reinforcing member 13 is illustrated as fixed at 14 to the cross member 12.

A front steerable road wheel 15 is independently suspended for relative upward and downward movement with respect to the frame structure 10 and with respect to the remaining road wheels of the vehicle by supporting and guiding mechanisms comprising a steering knuckle 16 housing a spindle 17 on which the wheel 15 is journalled. The steering knuckle 16 is pivotally connected by a king pin 18 with the generally vertically extending knuckle bracket support arm 19. The arm 19 is articulated or pivoted at its upper and lower ends respectively with upper and lower laterally extending linkages 20 and 21 of the suspension.

The linkages 20 and 21 may be of any suitable construction, those shown being of the semi-wishbone type. Thus, the upper linkage 20 comprises a pair of outwardly diverging arms 22 and 23 joined together preferably by a bolt 24 and extending outwardly from side rail 11 of the vehicle and having their outer ends pivotally connected to the upper end of the arm 19 by pivotal cushioning support members hereinafter more fully described. The inner ends of the arms 22 and 23 diverge to provide a fork-like structure on the corresponding end of the upper linkage 20, which straddles a channel-shaped supporting bracket 25 rigidly mounted on the frame structure 10 by suitable fasteners 26.

The inner end of the linkage 20 is pivotally attached to the bracket 25 by a pin 27 threaded in aligned apertures 27' in the opposite sides of the channel-shaped bracket 25 and threaded in aligned apertures 27'' provided in the inner end portions of the arms 22 and 23.

The lower linkage 21 preferably comprises a pair of angularly disposed arms 28 and 29 joined together intermediate the ends of the arm 29 at 30. The arm 29 extends in the general direction of the width of the vehicle and has a bifurcated end portion 31 comprising prongs 32 and 33 extending outwardly and disposed on opposite sides of and pivotally attached to the lower end of the support arm 19 by a pin 34. The inner end of the arm 28 is provided with a ball which is articulated in a bracket 35 fixed to the underside of the side rail 11, and the inner end of the arm 29 is provided with a tubular element 36' having a rubber sleeve 37' therein in which a pin 36 is received. The ends of the pin 36 are attached by bolts 35' to the under side of the cross member 12 in order to pivotally and flexibly connect the arm 29 to the chassis frame.

A cup-shaped spring seat 37 is mounted on the arm 29, intermediate its ends, by fasteners 39. Mounted in the cup 37 is a coil spring 40 and a bumper 41 preferably comprising rubber. The upper end of the spring bears against a projecting frame portion 42 in order to yieldingly support the frame structure 10 on the wheel 15 through the intermediary of the suspension mechanism. If desired, other forms of linkages and springing means may be provided and it is not my intention to limit my invention in its broader aspects to the particular form and arrangement of parts shown herein for purposes of illustration.

Interposed between the arm 29 and the upper linkage 20 is a suitable shock absorber 43, preferably of the well-known direct-acting telescoping tubular type having relatively movable tubular parts 44 and 45. The lower tubular part 45 is suitably pivotally mounted on the lower arm 29 by a bolt 46 preferably extending through a rubber-lined eye on the tubular part 45 and through an aperture in a lug 47 carried by the arm 29 in order to reduce sound transmission through the shock absorber. The companion shock absorber part 44 has its upper end directly mounted on a protruding end portion of the bolt 24 of the upper linkage 20 which extends through a rubber-lined eye on the upper end of the tubular part 44.

Attention is directed to the novelty of the shock absorber mounting of my improved suspension wherein articulated connections are provided for attaching the shock absorber directly to the suspension linkage to eliminate excess parts. Thus, I have illustrated the lower connection as being provided by arm 29 and the upper connection by the bolt 24 which joins the arms 22 and 23 of the upper linkage 20. The arrangement is therefore greatly simplified and the cost minimized by utilizing the connecting means for the arms of the upper linkage to connect with one of the moving parts of the shock absorber and also by utilizing the lower linkage for connection with the other moving part of the shock absorber.

Referring now to the details of my cushioning pivotal support means, I prefer to illustrate this means as connecting the upper linkage 20 and arm 19, but wish to point out that this means may be used to pivotally connect any two support members of the suspension linkage. A pin 48 (best shown in Figs. 2, 3 and 4) is suitably fixed to the outward ends of the arms 22 and 23 as will presently be apparent. A cylindrical bore 49 in the upper end of arm 19 extends mainly in the direction of the length of the vehicle. Within the bore 49 a sound-deadening rubber bushing 50 is suitably housed, the bore 49 and bushing 50 being placed on the mid-section of the pin 48 in assembling the arm 19 to this pin. The rubber sleeve 50 may be under compression between the pin 48 and the wall of the bore 49 or it may be suitably bonded by vulcanization or otherwise secured to the surface thereof. This connection accommodates relative movement between the knuckle bracket and upper linkage through yielding of the rubber bushing. The arrangement eliminates the necessity for lubrication at the connection. The pin and sleeve 50 can be pre-assembled and the ends of the separable arms 22 and 23 of the upper linkage 20 may be attached to the end portions of pin 48 during installation of the parts of the suspension on a vehicle.

A cushioned articulated connection is thus provided between two of the support members of the suspension linkage. The arm 19 is in direct contact with rubber carried by the upper linkage so that undesirable shocks and noise therethrough from wheel 15 are materially dampened and reduced respectively. My connection provides a highly desirable and inexpensive means for pivotally connecting two suspension members during production with a minimum of parts; futhermore, the parts of my connection can be easily and conveniently replaced if necessary.

My improved camber adjusting means is applicable to any of the vehicle steerable ground wheels, and therefore I shall describe my camber adjustment in connection with the wheel 15 as illustrated.

The wheel 15 is illustrated in its normal position and is preferably cambered so that the plane Y—Y of each wheel extends upwardly and outwardly at an inclination to the vertical, the camber angle being designated at Y' in Fig. 1. The desirability of camber for steering wheels is generally accepted and understood.

To effect the desirable angle Y', I have illustrated the outer ends of arms 22 and 23 as carrying elongated holes 51 and 52 respectively, although it will be evident that these holes 51 and 52 may be carried by the ends of pin 48, if desired.

Tapered end portions 53 and 54 are preferably provided on pin 48 having holes 55 and 56 adapted for alignment with the elongated holes 51 and 52 respectively of the upper linkage. In Figs. 2 and 3 it is apparent that when the holes 51, 52 and 55, 56 are properly aligned and locked, the arm 19 tilts the wheel 15 as desired.

To adjustably maintain the desired wheel camber, suitable fasteners 57, preferably comprising bolts, are provided to pass through the pairs of aligned holes 51, 55 and 52, 56 to clamp the arms 22, 23 and 19 together. The elongated holes 51 and 52 should be of sufficient length to permit the fasteners 57 to be moved therein in making camber adjustments of the wheel 15. I prefer to illustrate a means for assisting in maintaining the selected position of pin 48 and arm ends 22 and 23, and to this end the lower face of each of the tapered end portions 53 and 54 of pin 48 has been provided with a series of suitable surface irregularities such as the longitudinally extending serrations 58 (best shown in Fig. 4) which are adapted to register with similar serrations on the upper face of the ends of the arms 22 and 23.

From the foregoing reference to the desirable characteristics of wheel geometry it follows that, prior to the teachings of my invention, it would be necessary to maintain at undesirably high cost an unusually high degree of machining tolerances and skill in assembly and general workmanship if these desirable characteristics are to be obtained with the required degree of precision in the production of motor vehicles. These objectionable factors are most pronounced in the so-called independently sprung wheels to which class my invention particularly relates. By virture of this camber adjusting mechanism corrections can be made to compensate for any inaccuracies in the various parts of the suspension linkage in an improved manner.

To overcome the aforesaid difficulties, inconvenience, and expense, I have provided means for adjusting the normal position of any ground wheel whereby to conveniently and accurately compensate for errors introduced during the manufacturing and assembling processes, as well as those occurring during the normal life of the motor vehicle. My adjusting means is furthermore operable after assembly of the wheel suspension and without requiring disassembly of the parts, jacking up the vehicle, or other operations beyond the manipulation of the adjusting means.

With reference now to the operation of my shock absorber in its illustrated position of Fig. 1, attention is directed to the fact that the upper connection is provided by the upper linkage 20 comparatively close to pin 27, whereas the lower connection is displaced outwardly near the end of the lower linkage 21. In other words, by mounting the shock absorber on the upper and lower linkages so that one of these mounting points is disposed further away from the longitudinal mid-plane of the vehicle, and also disposed at a greater distance from the inner pivoted end of the linkage upon which it is mounted than the mounting point of the other part of the shock absorber, a shorter shock absorber may be used with the same effectiveness as a relatively longer one for a given desired stroke.

It is obviously evident that when the wheel 15 of Fig. 1 strikes a bump, the upper shock absorber connection 24 of linkage 20 moves upward slower and throughout a shorter distance than the faster rising lower shock absorber connection 46 of linkage 21. Consequently, the shock caused by the wheel 15 striking a bump is reduced by reason of the shock absorbing qualities of shock absorber 43 and also by the upper shock absorber connection moving away from the lower connection simultaneously. The same effect occurs on the rebound of wheel 15—the lower shock absorber mounting 46 rapidly moving away from the slower following upper mounting 24 so that the shock of the rebound is reduced.

In the Fig. 1 illustration it will be noted that during a rise of wheel 15 the upper shock absorber connection 24 moves from its normal position 59 to substantially its upper position 60; whereas the lower shock absorber connection 46 simultaneously travels in a longer arc between its normal position 61 to its upper position 62 by reason of the greater effective length of the lower linkage 21. The same action occurs when the wheel 15 drops, the upper connection 24 swinging through a comparatively shorter arc to its lower position 63 whereas the lower connection 46 simultaneously swings through a longer arc to its lower position 64. Thus, it is evident that when the wheel 15 is raised or lowered, the lower connection 46 moves with greater velocity than the upper connection 24 to effect differential movement of the upper and lower shock absorber connections. With my ilustrated shock absorber arrangement the distance between the shock shock absorber connections 24 and 46 is shortened when wheel 15 rises, as compared with a greater distance between these connections in the well-known vehicle independent supension; similarly when wheel 15 is lowered the distance between my illustrated shock absorber connections 24 and 46 is lengthened.

This differential action of connections 24 and 46 gives the effect of a longer shock absorber for a given stroke, resulting in a substantial decrease in weight and cost. Furthermore, my shock absorber arrangement positions one connection of the shock absorber near the outer end of either the upper or lower suspension linkages, as desired, where it is most effective and where it can best dampen wheel movements.

Referring now to Fig. 5 wherein I have shown another modification of my differentially acting shock absorber, parts of similar function to those shown in Figs. 1 to 4 but of different construction have been indicated by corresponding printed "x" reference numerals.

In this form of the invention, the shock absorber upper connection is provided substantially at 65$^x$ by the upper end of arm 19$^x$ whereas the lower connection 66$^x$ is positioned near the inner end of lower linkage 21$^x$.

In this particular embodiment, when the spindle 17ˣ rises, the upper shock absorber connection 65ˣ moves away faster than the slower rising lower connection 66ˣ which is located at a shorter distance from the pivotal point 36ˣ than is the connection 65ˣ. As a result, the shock caused by the wheel striking a bump is reduced by reason of the shock absorbing action of shock absorber 43ˣ and also by the lower shock absorber connection 66ˣ slowly and simultaneously following the upper connection 65ˣ. Substantially the same effect occurs during the rebound of the ground wheel, the lower shock absorber connection 66ˣ moving slowly away from the faster following upper mounting 65 so that the shock of the rebound is satisfactorily reduced.

Referring now to Figs. 6, 7 and 8 in which I have shown still another modification of my improved suspension, I have indicated parts of similar function but different construction by primed "y" reference characters.

In this embodiment the upper shock absorber connection is generally indicated at 67 on the mid-portion of the upper linkage 20ʸ whereas the lower connection 68 is positioned on a lower extension 69 of arm 19ʸ.

When the wheel 15ʸ strikes a bump, the upper shock absorber connection 67 swings away slower than the faster rising lower connection 68. Consequently the shock caused by the wheel striking a bump is reduced by reason of the shock absorbing qualities of the shock absorber 43ʸ and also by the upper shock absorber connection 67 slowly and simultaneously moving away from the lower connection 68. During the rebound of wheel 15ʸ substantially the same effect occurs, the upper shock absorber connection 68 slowly following the rapidly moving lower connection 68 so that the shock of the rebound is efficiently dampened. My novel positioning of the shock absorber lower connection in this embodiment further effects a saving in the length of the shock absorber by bringing the shock absorber connections closer together than would be conveniently possible if the shock absorber lower connection were carried by the lower linkage of the suspension.

To still further reduce the cost and weight of my improved suspension, a novel unitary spring seat member 70, preferably formed of a sheet metal stamping, is suitably fixed to the arms 28ʸ and 29ʸ by fasteners 71 and serves as a reinforcing cross member for these arms. An integral conical extension 72 of member 70 is adapted to be surrounded by the coil spring 40ʸ while the upper face of member 70 provides the lower seat for this coil spring so that the spring is free to assume proper positions without binding tendencies as the wheel 15ʸ rises and falls with respect to the vehicle frame. The other spring seat is provided by the frame 10ʸ. A resilient bumper 41ʸ is suitably fixed at 73 to the topmost portion of extension 72. The bumper 41ʸ is adapted to function in the well-known manner and I have provided a suitable abutment member 74 on the frame 10ʸ to limit the upward movement of the lower linkage 21ʸ.

Thus I have provided a lower linkage whose cross member may be formed of a sheet metal stamping and which also functions as a coil spring seat and a bumper cup. An improved and simplified suspension linkage is thereby effected which is capable of being produced at low cost, resulting in less unsprung weight for the vehicle.

The upper linkage 20ʸ illustrated in this embodiment of the invention is provided with a suitable articulated connection 75 on the upper end of arm 19ʸ. I prefer to provide the inner ends of arms 22ʸ and 23ʸ with my novel upper linkage frame support whereby the upper linkage is pivotally connected directly to the vehicle frame. To this end a support member 76 (best shown in Fig. 7) is provided with integral threaded end portions or bosses 77 and 78 which are threaded in the aligned apertures 79 of the inner ends of arms 22ʸ and 23ʸ respectively.

The support member 76 has suitable extensions or ears 80 which receive fasteners 81 for clamping the member 76 to the vehicle frame. I have provided a novel frame construction at this point to provide a strong and efficient anchorage for support member 76 carrying the upper linkage 20ʸ. A box-like portion 82 of one of the members of cross member 12ʸ is provided with aligned holes 83 to receive the fasteners 81. Within the box-like portion 82 the fasteners 81 are adapted to receive tubular spacers 84 having lower ends holding a cover or plate member 85 in spaced relation to the top wall providing a reinforced closed box to materially increase the rigidity at this point although the weight of the frame is reduced. To further secure the plate member 85 to the cross member 12ʸ, suitable fasteners 86 are provided.

The abutment member 74 may, if desired, be suitably fixed to the lower face of plate member 85, and a flange portion 87 of member 74 may thereby be adapted to function as the upper seat for spring 40ʸ.

A resilient bumper 88 may be provided somewhere in the suspension to yieldingly limit the downward swinging movement of the upper linkage 20ʸ and I have illustrated the bumper as being suitably fixed to a reinforcing end member 89 of cross member 12ʸ.

Although but several specific embodiments of the invention are herein shown and described, it will be understood that various changes in the size, shape and arrangement of parts may be made without departing from the spirit of my invention and it is not my intention to limit said invention other than by the terms of the appended claims.

What I claim is:

1. In a motor vehicle including a support structure, a road wheel disposed at one side of said structure, a wheel supporting structure including an upstanding arm, means structurally connecting said structures for guiding rising and falling movements of said wheel relative to said support structure, including a linkage having a pair of arms adapted to be operatively connected with said upstanding arm, each of said linkage arms having an opening in the end portion thereof adjacent said upstanding arm, a pin operably connecting said linkage arms and said upstanding arm, said pin having an opening in each end portion thereof registering with the opening in the adjacent arm end portion, and a fastener extending through each of the registering openings in said linkage arms and said pin for maintaining said pin in fixed position of adjustment relative to said linkage arms, said registering openings accommodating movement of said pin transversely with respect to its axis and generally longitudinally with respect to said linkage arms for varying the vertical position of said upstanding arm.

2. In a motor vehicle including support means, a road wheel disposed at one side of said support means, a wheel supporting structure, means including an arm structure operatively connecting said support means and said wheel supporting structure for guiding rising and falling movements of said wheel relative to said support means, a pin operably connecting said arm structure and said wheel supporting structure, one of said structures and said pin having registering openings therein, fastening means disposed in said openings for fixedly securing said pin against movement relative to said last mentioned structure in response to rising and falling movements of said wheel, said openings accommodating movement of said pin in a direction transversely with respect to its axis and in a direction generally longitudinally with respect to said arm structure for varying the position of said wheel support structure relative to said arm structure.

3. In a motor vehicle including a support structure, a road wheel disposed at one side of said structure, a wheel supporting structure, means including a link member intermediate said structures for guiding vertical displacement of said wheel, a pin member operably connecting said linkage member and said wheel supporting structure, at least one of said members having an opening therein, fastening means disposed in said opening for maintaining said members in fixed position of adjustment and against relative movement in response to vertical displacement of said wheel, said fastening means being movable in said opening for accommodating movement of said pin member transversely with respect to the axis thereof for varying the position of said wheel support structure relative to said linkage member.

4. In a motor vehicle including a support structure, a road wheel disposed at one side of said structure, a wheel supporting structure, means including a link member intermediate said structures for guiding vertical displacement of said wheel, a pin member operably connecting said linkage member and said wheel supporting structure, at least one of said members having an opening therein, fastening means disposed in said opening for maintaining said members in fixed position of adjustment and against relative movement in response to vertical displacement of said wheel, said fastening means being movable in said opening for accommodating movement of said pin member transversely with respect to the axis thereof for varying the position of said wheel support structure relative to said linkage member, and a bushing comprising a body of yieldably non-metallic material connecting said pin member and said wheel supporting structure, said bushing accommodating relative movement between said pin and said wheel supporting structure in response to vertical displacement of said wheel.

FREDERIC W. SLACK.